(12) United States Patent
Aiba et al.

(10) Patent No.: US 9,055,572 B2
(45) Date of Patent: Jun. 9, 2015

(54) USER EQUIPMENT, BASE STATION APPARATUS, COMMUNICATION SYSTEM AND MOBILE COMMUNICATION METHODS FOR UPLINK CONTROL INFORMATION

(75) Inventors: Tatsushi Aiba, Osaka (JP); Lei Huang, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 236 days.

(21) Appl. No.: 13/702,877

(22) PCT Filed: Jun. 10, 2011

(86) PCT No.: PCT/JP2011/063862
§ 371 (c)(1),
(2), (4) Date: Dec. 7, 2012

(87) PCT Pub. No.: WO2011/158921
PCT Pub. Date: Dec. 22, 2011

(65) Prior Publication Data
US 2013/0077595 A1    Mar. 28, 2013

(30) Foreign Application Priority Data
Jun. 14, 2010    (JP) .................................. 2010-135374

(51) Int. Cl.
*H04W 72/04* (2009.01)
*H04L 5/00* (2006.01)
*H04W 28/06* (2009.01)
(Continued)

(52) U.S. Cl.
CPC ......... *H04W 72/0413* (2013.01); *H04L 1/0026* (2013.01); *H04L 1/0041* (2013.01); *H04L 1/0059* (2013.01); *H04L 1/0061* (2013.01); *H04L 1/0072* (2013.01); *H04L 5/001* (2013.01); *H04L 2001/125* (2013.01); *H04W 24/10* (2013.01); *H04W 28/06* (2013.01)

(58) Field of Classification Search
CPC .................................................. H04W 72/0413
USPC ........................................ 370/252, 329, 522
See application file for complete search history.

(56) References Cited

U.S. PATENT DOCUMENTS

| 8,724,564 | B2* | 5/2014 | Kim et al. ..................... 370/329 |
| 2009/0204863 | A1* | 8/2009 | Kim et al. ..................... 714/748 |

(Continued)

OTHER PUBLICATIONS

3GPP, "Further advancements for E-UTRA physical layer aspects," 3rd Generation Partnership Project, Technical Specification Group Radio Access Network, 3GPP TR 36.814 V9.0.0, Mar. 2010.
Catt, "CQI feedback for LTE-A," 3GPP TSG RAN WG1 Meeting #59bis, R1-100014, Valencia, ES, Jan. 18-Jan. 22, 2010.
Ericsson, "Carrier aggregation in LTE-Advanced," 3GPP TSG-RAN WG1 #53bis, R1-082468, Warsaw, PL, Jun. 30-Jul. 4, 2008.

(Continued)

*Primary Examiner* — Christopher Grey
(74) *Attorney, Agent, or Firm* — Birch, Stewart, Kolasch & Birch, LLP

(57) ABSTRACT

A user equipment for performing effective coding scheme of uplink control information transmission is provided. The user equipment transmits, to a base station apparatus, channel state information for multiple downlink component carriers, the user equipment comprising: a determining unit for determining, the number of coded symbol for the channel state information for multiple downlink component carriers, using the number of bits, which is obtained by concatenating channel state information bits for each downlink component carrier and attaching Cyclic Redundancy Check (CRC) bits to the concatenated channel state information bits for each downlink component carrier.

16 Claims, 12 Drawing Sheets

(51) Int. Cl.
 *H04L 1/00* (2006.01)
 *H04L 1/12* (2006.01)
 *H04W 24/10* (2009.01)

(56) References Cited

U.S. PATENT DOCUMENTS

2010/0311430 A1* 12/2010 Katayama et al. ............ 455/450
2012/0113831 A1* 5/2012 Pelletier et al. ............... 370/252

OTHER PUBLICATIONS

International Search Report issued in PCT/JP2011/063862 mailed Jul. 12, 2011.
Qualcomm Inc., "UCI Multiplexing for SU-MIMO Transmission," 3GPP TSG-RAN WG1 #61, R1-102762, Montreal, CA, May 10-May 14, 2010.
Samsung, "Further Discussion on Data and Control Multiplexing in UL MIMO Transmissions," 3GPP TSG RAN WG1 #61, R1-103037, Montreal, CA, May 10-May 14, 2010.

* cited by examiner

USER EQUIPMENT, BASE STATION APPARATUS, COMMUNICATION SYSTEM AND MOBILE COMMUNICATION METHODS FOR UPLINK CONTROL INFORMATION

TECHNICAL FIELD

The present invention relates to a communication technique, and particularly relates to a user equipment, base station apparatus, communication system and mobile communication method for uplink control information.

BACKGROUND ART

3GPP (The $3^{rd}$ Generation Partner Project) standardization organization is working out the next generation of wireless communication standard which is named LTE (Long Term Evolution). In a physical layer interface, the new standard adopts OFDM (Orthogonal Frequency Division Multiplexing) technology, which is different from conventional CDMA (Code Division Multiple Access) technology. In LTE, OFDMA (Orthogonal Frequency Division Multiple Access) is used in downlinks (DL) and SC-FDMA (Single Carrier Frequency Division Multiple Access) is used in uplinks (UL). The technology used in the new standard is effective for multi-path propagation, with adoption of frequency domain equalization reducing complexity of the conventional time domain equalization, and is more suitable for wider bandwidth high-speed data transmission.

The 3GPP is also working out LTE-Advanced (Advanced-LTE) which is likely the major enhancements to LTE. The LTE-Advanced will be introduced in Release 10 after a correction and improvement phase in LTE Release 9. LTE-Advanced shall fulfill the requirements as set by the ITU (International Telecommunication Union).

In LTE-Advanced, the size of UCI (Uplink Control Information, e.g., HARQ-ACK/NACK, CQI (Channel Quality Indicator), PMI (Precoding Matrix Indicator, for example, indicated by 2 kinds of channel properties, W_1: taking care of wideband and/or long-term channel properties, W_2: matching the instantaneous properties of the effective channel), RI (Rank indication)) will increase rapidly, e.g., due to downlink cooperative multipoint (CoMP) transmissions, carrier aggregation, and/or higher order MIMO.

Carrier aggregation, where two or more component carriers are aggregated is considered for LTE-Advanced in order to support transmission bandwidth larger than 20 MHz, up to 100 MHz (see Non-Patent Document 1 below). From a UE perspective, there is one transport block (in absence of spatial multiplexing) and one HARQ entity per scheduled component carrier. A UE may be scheduled over multiple component carriers and each transport block is mapped within a single component carrier.

According to current assumption of LTE-Advanced, the uplink multiple access has the following properties (see Non-Patent Document 2 below). Multiple transmission antennas will be used for LTE-Advanced uplink transmission and DFT (Discrete Fourier transform)-precoded OFDM is the transmission scheme used for PUSCH (Physical Uplink Shared Channel) both in absence and presence of spatial multiplexing. In case of multiple component carriers, there is one DFT per component carrier. Both frequency-contiguous and frequency-non-contiguous resource allocation is supported on each component carrier. Simultaneous transmission of uplink L1/L2 control signaling and data (e.g., UL-SCH (Uplink Shared Channel) transport blocks, UL-SCH (Uplink Shared Channel) data) is supported through two mechanisms: control signaling is multiplexed with data on PUSCH according to the same principle as in Rel-8; control signaling is transmitted on PUCCH (Physical Uplink Control Channel) simultaneously with data on PUSCH.

Regarding UCI (Uplink Control Information) multiplexing on PUSCH, some contributions propose how to deal with the UCI transmission on multiple layers of multiple codewords (see Non-patent Document 3). The design of multiplexing of UCI and data on PUSCH for multiple transmission antennas UEs must take some aspects into consideration that were not an issue in the single antenna PUSCH transmission of LTE Rel-8. For example, UCI is mapped onto all the 4 layers, or is mapped onto 2 layers of one selected codeword, or is mapped onto a single layer of one selected codeword. All these techniques just focus on the physical layer processing and they do not involve any scheduling and channel coding related procedure.

Non-Patent Document 1: "Carrier aggregation in LTE-Advanced", 3GPP TSG RAN WG1 Meeting #53bis, R1-082468, June, 2008.

Non-Patent Document 2: "3GPP TSG RAN Further Advancements for E-UTRA Physical Layer Aspects (Release 9)", 3GPP TS 36.814 V2.0.1, 2010-03.

Non-Patent Document 3: "Further Discussion on Data and Control Multiplexing in UL MIMO Transmissions", 3GPP TSG RAN WG1 Meeting #61, R1-103037, May, 2010.

Technical Problem

However, in the above conventional techniques, they do not consider channel coding for UCI on PUSCH in LTE-Advanced. There is no concrete description on how to deal with the channel coding for the increased UCI on PUSCH efficiently under the situation of multiple uplink transmit antenna.

Some of the above conventional techniques tried to feedback UCI on PUCCH considering different component carrier scheduling situations, but they did not consider any situation for UCI on PUSCH. Other conventional techniques announced the issues for UCI on PUSCH, which are caused by uplink multiple antenna transmission, and relevant solutions. However, they were not related to the channel coding procedure.

The present invention has been made in view of the foregoing circumstances, and its object is to provide a user equipment, base station apparatus, communication system and mobile communication method, which perform efficient channel coding scheme of UCI and achieve more efficient transmission control (scheduling) between the eNB and the UE.

SUMMARY OF INVENTION

According to the present invention, the base station and the mobile station can perform efficient channel coding scheme of UCI and achieve more efficient transmission control (scheduling) between the eNB and the UE.

The present invention includes a user equipment which transmits, to a base station apparatus, channel state information for multiple downlink component carriers, the user equipment comprising:

a determining unit for determining, the number of coded symbol for the channel state information for multiple downlink component carriers, using the number of bits, which is obtained by concatenating channel state information bits for each downlink component carrier and attaching Cyclic Redundancy Check (CRC) bits to the concatenated channel state information bits for each downlink component carrier.

By determining the number of symbols for channel coded uplink control information even if multiple DL CCs are configured for data transmission, the present invention can transmit the increased UCI via PUSCH to the base station effectively. This leads to the advantageous effects of (1) the base station and user equipment being able to perform efficient channel coding scheme of UCI, and (2) the base station and user equipment being able to achieve more efficient transmission control (scheduling).

The present invention includes a user equipment which transmits, to a base station apparatus, channel state information for multiple downlink component carriers together with uplink shared channel (UL-SCH) data using a physical uplink shared channel, the user equipment comprising:
a determining unit for determining, the number of coded symbol for the channel state information for multiple downlink component carriers, using the number of bits, which is obtained by concatenating channel state information bits for each downlink component carrier and attaching Cyclic Redundancy Check (CRC) bits to the concatenated channel state information bits for each downlink component carrier; and
a transmitting unit for transmitting, to the base station apparatus, the channel state information for multiple downlink component carriers with the number of coded symbol determined by the determining unit, together with the uplink shared channel (UL-SCH) data using the physical uplink shared channel.

By determining the number of symbols for channel coded uplink control information even if multiple DL CCs are configured for data transmission, the present invention can transmit the increased UCI via PUSCH to the base station effectively. This leads to the advantageous effects of (1) the base station and user equipment being able to perform efficient channel coding scheme of UCI, and (2) the base station and user equipment being able to achieve more efficient transmission control (scheduling).

The present invention includes a base station apparatus which receives, from a user equipment, channel state information for multiple downlink component carriers together with uplink shared channel (UL-SCH) data using a physical uplink shared channel, the base station apparatus comprising:
a receiving unit for receiving, from the user equipment, the channel state information for multiple downlink component carriers with the number of coded symbol determined by the user equipment, together with the uplink shared channel (UL-SCH) data using the physical uplink shared channel, wherein
the number of coded symbol for the channel state information for multiple downlink component carriers is determined, by the user equipment, using the number of bits, which is obtained by concatenating channel state information bits for each downlink component carrier and attaching Cyclic Redundancy Check (CRC) bits to the concatenated channel state information bits for each downlink component carrier.

The effect of this is that the base station and user equipment can perform efficient channel coding scheme of UCI, and the base station and user equipment can achieve more efficient transmission control (scheduling).

The present invention includes a method of a user equipment for transmitting, to a base station apparatus, channel state information for multiple downlink component carriers, the method comprising:
determining, the number of coded symbol for the channel state information for multiple downlink component carriers, using the number of bits, which is obtained by concatenating channel state information bits for each downlink component carrier and attaching Cyclic Redundancy Check (CRC) bits to the concatenated channel state information bits for each downlink component carrier.

The effect of this is that the base station and user equipment can perform efficient channel coding scheme of UCI, and the base station and user equipment can achieve more efficient transmission control (scheduling).

The present invention includes a method of a user equipment for transmitting, to a base station apparatus, channel state information for multiple downlink component carriers together with uplink shared channel (UL-SCH) data using a physical uplink shared channel, the method comprising the steps of:
determining, the number of coded symbol for the channel state information for multiple downlink component carriers, using the number of bits, which is obtained by concatenating channel state information bits for each downlink component carrier and attaching Cyclic Redundancy Check (CRC) bits to the concatenated channel state information bits for each downlink component carrier; and
transmitting, to the base station apparatus, the channel state information for multiple downlink component carriers with the number of coded symbol determined, together with the uplink shared channel (UL-SCH) data using the physical uplink shared channel.

The effect of this is that the base station and user equipment can perform efficient channel coding scheme of UCI, and the base station and user equipment can achieve more efficient transmission control (scheduling).

The present invention includes a method of a base station apparatus for receiving, from a user equipment, channel state information for multiple downlink component carriers together with uplink shared channel (UL-SCH) data using a physical uplink shared channel, the method comprising:
receiving, from the user equipment, the channel state information for multiple downlink component carriers with the number of coded symbol determined by the user equipment, together with the uplink shared channel (UL-SCH) data using the physical uplink shared channel, wherein
the number of coded symbol for the channel state information for multiple downlink component carriers is determined, by the user equipment, using the number of bits, which is obtained by concatenating channel state information bits for each downlink component carrier and attaching Cyclic Redundancy Check (CRC) bits to the concatenated channel state information bits for each downlink component carrier.

The effect of this is that the base station and user equipment can perform efficient channel coding scheme of UCI, and the base station and user equipment can achieve more efficient transmission control (scheduling).

The present invention includes a communication system in which a user equipment transmits, to a base station apparatus, channel state information for multiple downlink component carriers together with uplink shared channel (UL-SCH) data using a physical uplink shared channel, the user equipment comprising:
a determining unit, the number of coded symbol for the channel state information for multiple downlink component carriers, using the number of bits, which is obtained by concatenating channel state information bits for each downlink component carrier and attaching Cyclic Redundancy Check (CRC) bits to the concatenated channel state information bits for each downlink component carrier; and
a transmitting unit, to the base station apparatus, the channel state information for multiple downlink component carriers with the number of coded symbol determined, together with the uplink shared channel (UL-SCH) data using the physical uplink shared channel,
the base station apparatus comprising:
a receiving unit, from the user equipment, the channel state information for multiple downlink component carriers with the number of coded symbol determined by the user equipment, together with the uplink shared channel (UL-SCH) data using the physical uplink shared channel.

The effect of this is that the base station and user equipment can perform efficient channel coding scheme of UCI, and the base station and user equipment can achieve more efficient transmission control (scheduling).

The foregoing and other objectives, features, and advantages of the invention will be more readily understood upon consideration of the following detailed description of the invention, taken in conjunction with the accompanying drawings.

DESCRIPTION OF EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Figure 1:
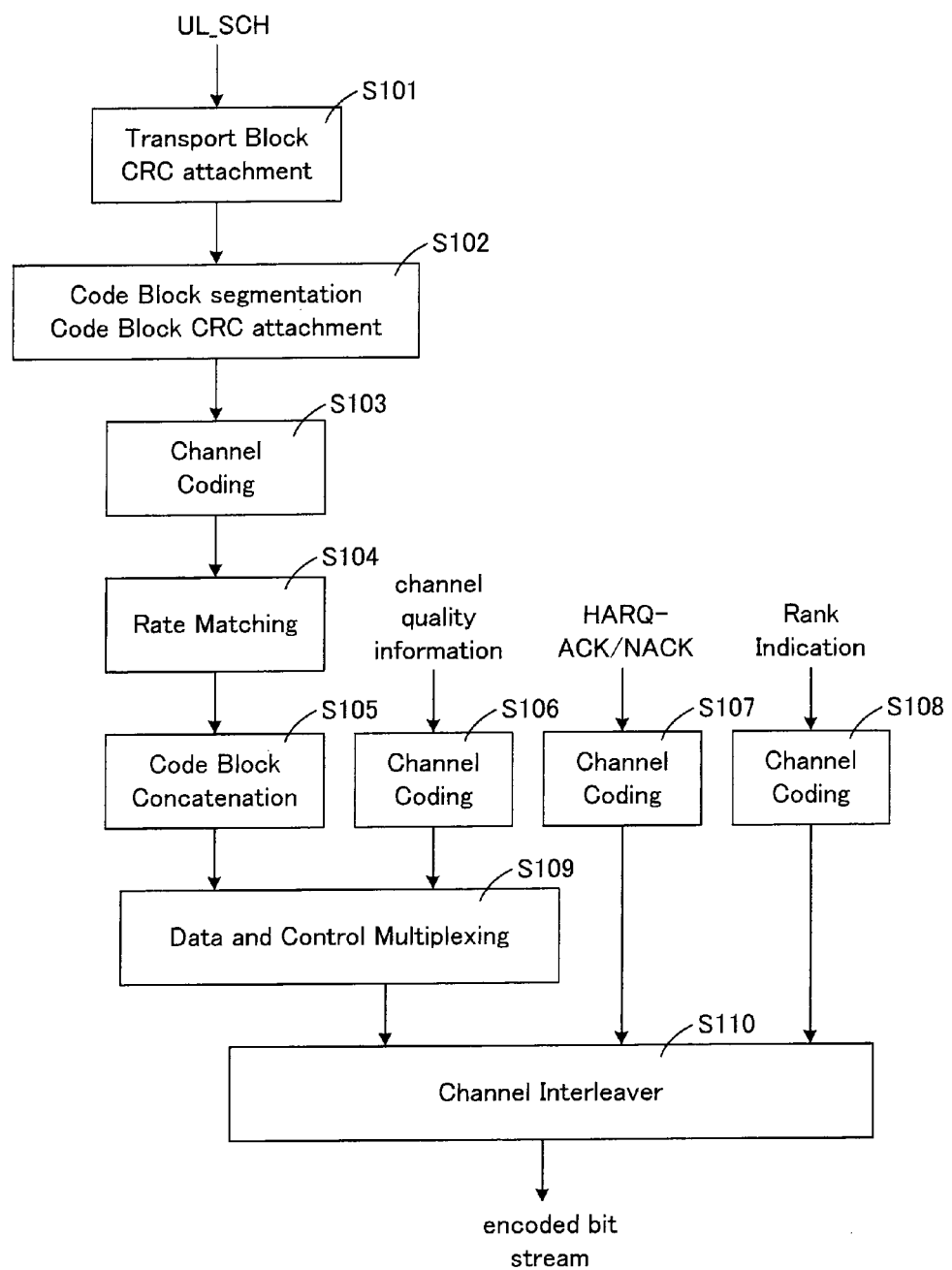
FIG. 1 is example of data and control multiplexing flowchart.

To well understand the present invention, the UCI (e.g., channel quality information (CQI and/or PMI), HARQ-ACK/NACK, rank indication) transmission via PUSCH in LTE Rel-8 system will be described as example according to FIG. 1 firstly.

Error detection is provided on UL-SCH transport blocks (i.e., uplink transmit data, UL-SCH data) through a Cyclic Redundancy Check (CRC). The entire block is used to calculate the CRC parity bits. The parity bits are computed and attached to the UL-SCH transport block in the Transport Block CRC attachment function S101. In code block segmentation and code block CRC attachment function S102, the input bits are segmented into several code blocks and CRC parity bits are computed and attached to each code block. Code blocks are delivered to the channel coding function S103. In this function, each code block is individually encoded implementing the turbo coding with rate 1/3. Turbo coded blocks are delivered to the rate matching function S104. In this function, each coded block is individually rate matched according to the procedure specified in LTE Rel-8. The bits of all coded blocks are concatenated in code block concatenation function S105. Above described S101~S105 functions are implemented as the channel coding procedure for uplink transmit data in UL-SCH.

Control data (i.e., UCI) arrives at the channel coding unit in the form of channel quality information (CQI and/or PMI), HARQ-ACK/NACK and rank indication. Different coding rates for the control information are achieved by allocating different number of coded symbols for its transmission. When control data are transmitted via PUSCH, the channel coding for HARQ-ACK/NACK, rank indication and channel quality information is done independently. For example as shown in FIG. 1, channel quality information bits are input to the channel coding function S106. In this function, if the payload size (k) of the channel quality information is less than or equal to 11 bits it is performed as (32, k) block coding without CRC attachment and rate matching. If the payload size of the channel quality information is greater than 11 bits, the tail biting convolutional coding is performed, the CRC attachment and rate matching is implemented accordingly.

The channel quality information bits and data bits are multiplexed in data and control multiplexing function S109. The channel quality information bits are multiplexed with data bits by simple serial concatenation and mapped altogether to the physical resources by a simple time-first mapping rule as described below in FIG. 2.

The HARQ-ACK/NACK bits are input to the channel coding function S107. In the channel coding function S107, in case of 1-bit HARQ-ACK/NACK, it performs repetition coding. In case of 2-bits HARQ-ACK/NACK, it performs (3, 2) simplex coding with optional circular repetition.

The rank indication bits are input to the channel coding function S108. In the channel coding function S108, in case of 1-bit HARQ-ACK/NACK, it performs repetition coding. In case of 2-bits HARQ-ACK/NACK, it performs (3, 2) simplex coding with optional circular repetition.

Figure 2:
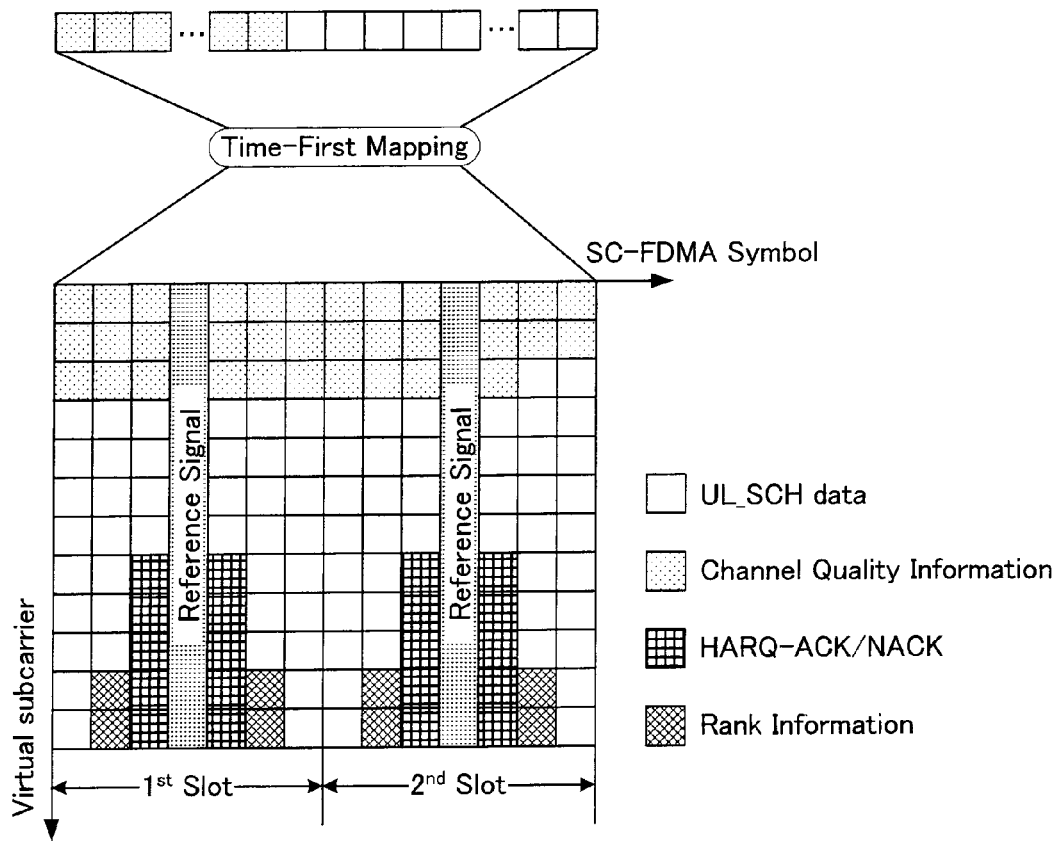
FIG. 2 is example of data and control interleaving layout.

Channel encoded control bits and data bits are multiplexed in a channel interleaver S110 before physical channel processing (e.g., scrambling, modulation, transform precoding, and resource element mapping etc.) as shown in FIG. 2. FIG. 2 shows example of the mapping of UCI and data to the physical resources (e.g., PUSCH resources). In this figure, the square stands for the modulation symbol. On each symbol several bits are mapped according to the MCS (Modulation and Coding Scheme) order, e.g., 2 bits for QPSK.

The channel interleaver in conjunction with the resource element mapping for PUSCH implements a time-first mapping of modulation symbols onto the transmit waveform while ensuring that HARQ-ACK/NACK information is present on both slots in the subframe and is mapped to resources around the uplink demodulation reference signals. Note that simple serial concatenated channel quality information and data bits are mapped to the elements of the interleaver, and the HARQ-ACK/NACK bits will puncture some elements for their transmission.

Namely, in case that the UE transmits, to the base station, the UCI (channel quality information (CQI and/or PMI), HARQ-ACK/NACK and rank indication) via PUSCH, the UCI is mapped to the PUSCH resources by the UE as shown in FIG. 2.

In detail, the UCI is mapped, by the UE, to the matrix which has the same size of PUSCH resources assigned by the base station. Firstly, if the rank information is transmitted in the subframe, the UE maps the rank information to the matrix as shown in FIG. 2. As example, the rank information is mapped, by the UE, next to the HARQ-ACK/NACK information.

Next, the UE maps the channel quality information (CQI and/or PMI) and data to the matrix as shown in FIG. 2. As shown in FIG. 2, the channel quality information is earlier concatenated with data (the time-first mapping), and mapped, by the UE, to the matrix. Here, the channel quality information and data are mapped to the matrix by skipping other information.

Next, if HARQ-ACK/NACK information is transmitted in the subframe, the UE maps the HARQ-ACK/NACK information to the matrix as shown in FIG. 2. As example, the HARQ-ACK/NACK information is mapped, by the UE, next to the reference signal. Here, the HARQ-ACK/NACK information is mapped to the matrix by overwriting other information.

Here, since the UE performs the DFT processing to the matrix, the matrix will spread to the frequency region.

Also, the system shown in FIG. 2 is only concerned with using one pair of UL/DL component carriers (ie. the uplink control information of only one component carrier). However, in order to perform effective channel coding performance, a system that consists of multiple pairs of UL/DL (consisting of several component carriers) should be used (ie. the uplink control information of multiple channel coding).

Figure 3:
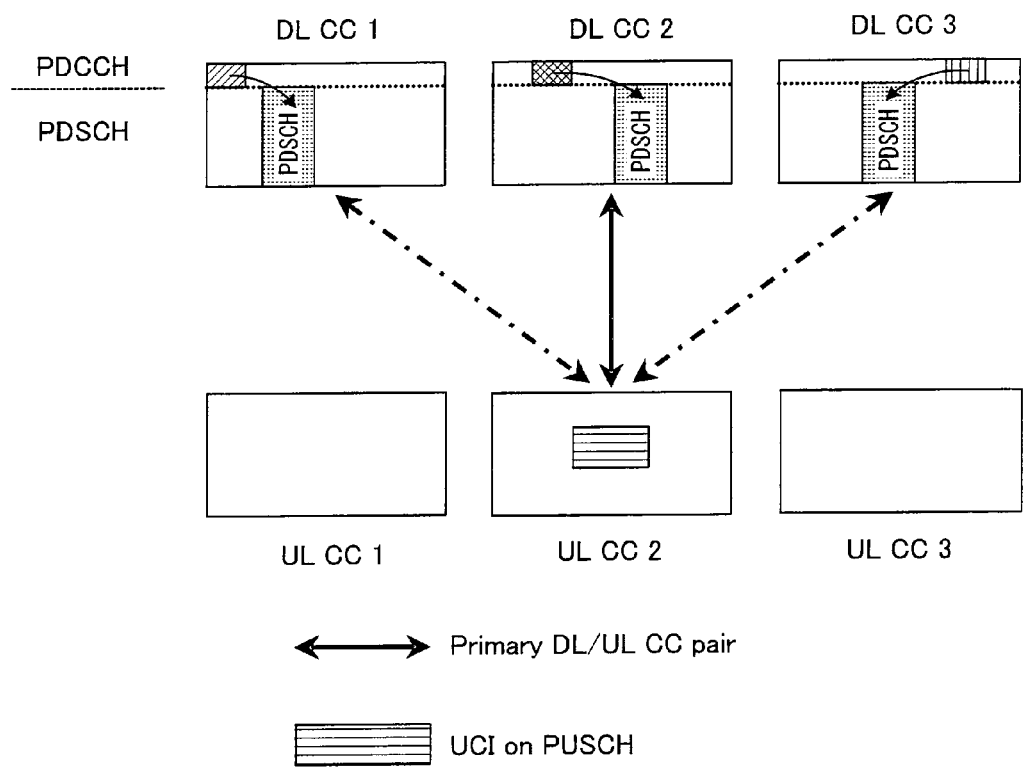
FIG. 3 is example of carrier aggregation capable system.

FIG. 3 shows this effect by using a system which supports wider transmission bandwidth consisting of several component carriers (the system which supports carrier aggregation). As example shown in FIG. 3, three downlink component carriers (DL CC1, DL CC2 and DL CC3) and three uplink component carriers (UL CC1, UL CC2 and UL CC3) are represented. The base station and the UE can perform DL/UL data transmission by utilizing multiple component carriers.

In FIG. 3, the base station can assign, to the UE, PDSCH by using PDCCH. FIG. 3 shows, the base station assigns, to the UE, the PDSCH mapped on DL CC1 by PDCCH mapped on DL CC 1 (represented by an oblique line block), the PDSCH mapped on DL CC2 by PDCCH mapped on DL CC2 (represented by a cross line block), and the PDSCH mapped on DL CC3 by PDCCH mapped on DL CC3 (represented by a vertical line block). Here, the base station can assign PDSCH on the same or different component carrier as/from where PDCCH is mapped.

In FIG. 3, according to the UE's capability and the situation of the resources in the cell etc., the base station can configure, to the UE, the DL CC set which is the downlink component carrier set where the PDSCH and/or PDCCH may be mapped according to the scheduling (assignment) of the base station. And the base station may configure, to the UE, the UL CC set which is the uplink component carrier set where the PUSCH and/or PUCCH may be mapped according to the scheduling (assignment) of the base station.

Here, in FIG. 3, the base station can configure, to the UE, a primary DL/UL CC pair. For example, the base station can cell-specifically configure, to the UE, the primary DL/UL CC pair by broadcast information (e.g., SIB: System Information Block). Also, for example, the base station can UE-specifically (semi-statically) configure, to the UE, the primary DL/UL CC pair by a dedicated signaling (e.g., a RRC signaling (Radio Resource Control signaling)). The RRC signaling is the signaling exchanged between the base station and the UE on higher-layer (RRC-layer). As example shown in FIG. 3, the base station configures, to the UE, DL CC2 and UL CC2 as the primary DL/UL CC pair.

Also, in FIG. 3, the base station can configure, to the UE, a primary DL CC. For example, the base station can cell-specifically configure, to the UE, the primary DL CC by broadcast information (e.g., SIB). Also, for example, the base station can UE-specifically (semi-statically) configure, to the UE, the primary DL CC by a dedicated signaling (e.g., the RRC signaling).

Furthermore, in FIG. 3, the base station can configure, to the UE, a primary UL CC. For example, the base station can cell-specifically configure, to the UE, the primary UL CC by broadcast information (e.g., SIB). Also, for example, the base station can UE-specifically (semi-statically) configure, to the UE, the primary UL CC by a dedicated signaling (e.g., the RRC signaling). As example shown in FIG. 3, the base station configures, to the UE, DL CC2 as the primary DL CC and the base station configures, to the UE, UL CC2 as the primary UL CC.

Also, in FIG. 3, the base station can configure, to the UE, single (one) UL CC for UCI transmission via PUSCH. For example, the base station can UE-specifically (semi-statically) configure, to the UE, the UL CC for UCI transmission via PUSCH by a dedicated signaling (e.g., the RRC signaling). Also, for example, the primary UL CC can be designated as the UL CC for UCI transmission via PUSCH. Also, the base station can configure, to the UE, the primary DL CC, and the UE performs UCI transmission via PUSCH on the UL CC corresponding to the configured DL CC (paired DL CC). As example shown in FIG. 3, the base station configures, to the UE, UL CC2 as the UL CC for UCI transmission via PUSCH.

The UE transmits, to the base station, UCI via PUSCH only on the UL CC configured by the base station. Namely, the UE transmits UCI (i.e., HARQ-ACK/NACK, and/or, CQI/PMI, and/or, RI) via PUSCH mapped on the UL CC semi-statically configured by the base station. FIG. 3 shows the UE transmits, to the base station, UCI via PUSCH on UL CC2 configured by the base station.

For example, the UE can transmit, to the base station, aperiodic or periodic CSI (Channel State Information, including channel quality information (CQI and/or PMI) and/or RI) reporting for DL CCs (e.g., up to 5 DL CCs) via PUSCH mapped on semi-statically configured single UE-specific UL CC. Also, for example, the UE can transmit, to the base station, HARQ-ACK/NACK for downlink transport blocks simultaneously scheduled on DL CCs (e.g., up to 5 DL CCs) via PUSCH mapped on the semi-statically configured single UE-specific UL CC.

Here, the UE can transmit UCI (e.g., HARQ-ACK/NACK, and/or, CQI/PMI, and/or, RI) via PUSCH mapped on the semi-statically configured single UE-specific UL CC.

Here, the CSI transmission via PUSCH can be triggered by the base station. For example, the base station can trigger the CSI transmission via PUSCH by using DCI format (Downlink Control Information format) including information which requests the CSI transmission via PUSCH (e.g., CSI request). For example, the base station can trigger the CSI transmission via PUSCH by setting to "1" in the CSI request field. Hereafter, for simplicity, the transmission of the CSI request set to "1" is described as the transmission of the CQI request.

The base station can transmit, to the UE, the DCI formats including the CSI requests via PDCCH on one or multiple DL CC. Namely, the base station can request, to the UE, the CSI transmission via PUSCH for one or multiple DL CCs. Namely, the UE can calculate (derive) the CSI for one or multiple downlink signals transmitted on one or multiple DL CCs. After receiving the CSI request for one or multiple DL CCs, the UE transmits, to the base station, the CSI via PUSCH.

Figure 4:
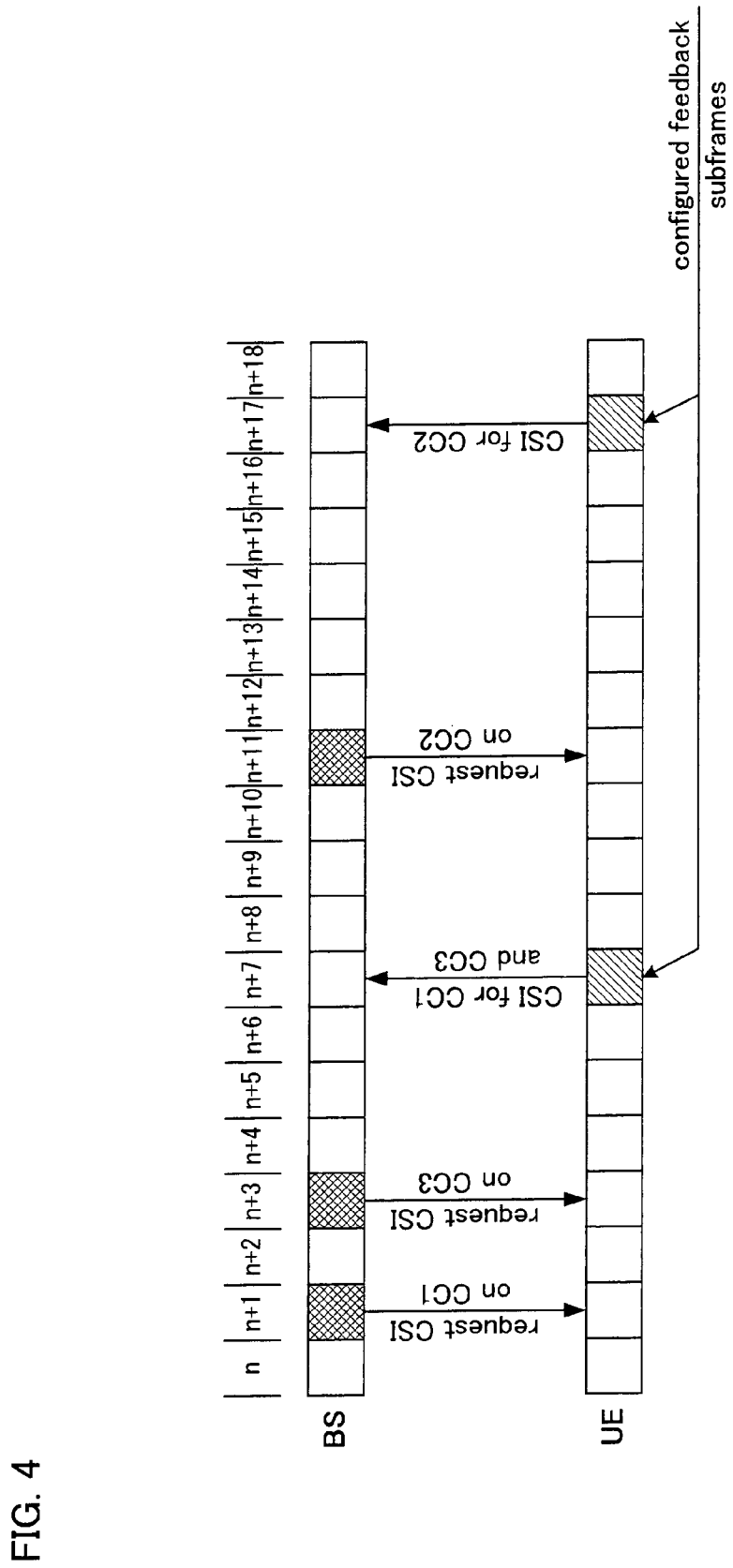
FIG. 4 is the first example of the trigger mechanism for CSI feedback on PUSCH.

FIG. 4 shows example of the CSI transmission via PUSCH. In FIG. 4, the UE is configured with some feedback subframes (e.g., subframe n+7, subframe n+17) via higher layer signaling (e.g., RRC signaling) semi-statically by the base station. In FIG. 4, in case that the UE is configured with some feedback subframes, the UE transmits, to the base station, the CSI on some configured subframes.

In FIG. 4, the base station transmits, to the UE, the DCI formats including the CSI request via PDCCH on different component carriers. The CSI request in DCI format on one component carrier requests the UE to feedback the CSI of this component carrier. The base station can schedule to transmit multiple CSI requests in DCI formats on multiple component carriers simultaneously. Also, the base station can schedule to transmit multiple CSI requests in DCI formats on multiple component carriers on multiple subframes.

After receiving these CSI requests, the UE transmits, to the base station, CSI(s) for requested component carriers on the latest configured feedback subframe. For example, in FIG. 4, the base station transmits, to the UE, the CSI request on DL CC 1 in subframe n+1, and it also transmits, to the UE, the CSI request on DL CC3 in subframe n+3. According to the configuration by the base station, subframe n+7 is the latest configured feedback subframe. So, the UE transmits, to the base station, the CSI of DL CC1 and CC3 via the PUSCH on subframe n+7.

Figure 5:
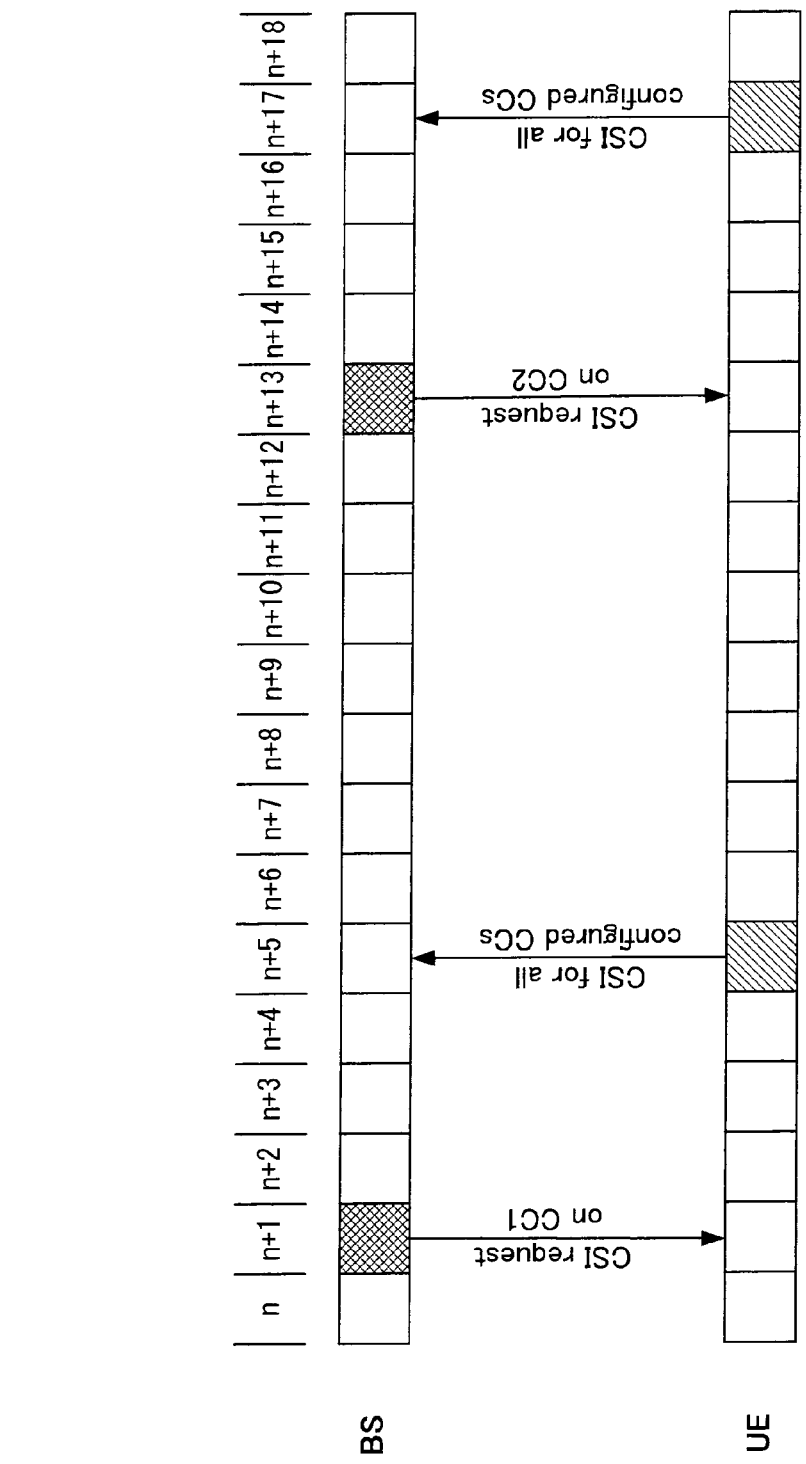
FIG. 5 is the second example of the trigger mechanism for CSI feedback on PUSCH.

FIG. 5 shows another example of the CSI transmission via PUSCH. In FIG. 5, the base station can request, to the UE, the CSI transmission of all DL CCs (all activated DL CCs) among the configured DL CC set. Here, the base station may configure DL CC sets which the UE calculates the CSI for. Namely, in FIG. 5, the base station can transmit, to the UE, the DCI format including the CSI request which requests to feedback CSI(s) of all (multiple) DL CC(s) among the configured DL CC set.

After receiving the DCI format including the CSI request, the UE transmits, to the base station, CSI(s) of all (multiple) DL CC(s) via PUSCH on one certain following subframe. For example, in FIG. 5, the base station transmits, to the UE, the DCI format including the CSI request via PDCCH on DL CC1 in subframe n+1. And the UE transmits, to the base station, CSI(s) of all (multiple) DL CC (s) (e.g., CSI (s) of DL CC1, DL CC2, DL CC3) via PUSCH in subframe n+5 (if define 4 subframe delay for transmitting CSI after receiving the CSI request). Also, in FIG. 5, the base station transmits, to the UE, the DCI format including the CSI request via PUCCH on DL CC2 in subframe n+13. And the UE transmits, to the base station, CSI(s) of all (multiple) DL CCs (e.g., CSI(s) of DL CC1, DL CC2, DL CC3) via PUSCH in subframe n+17.

Figure 6:
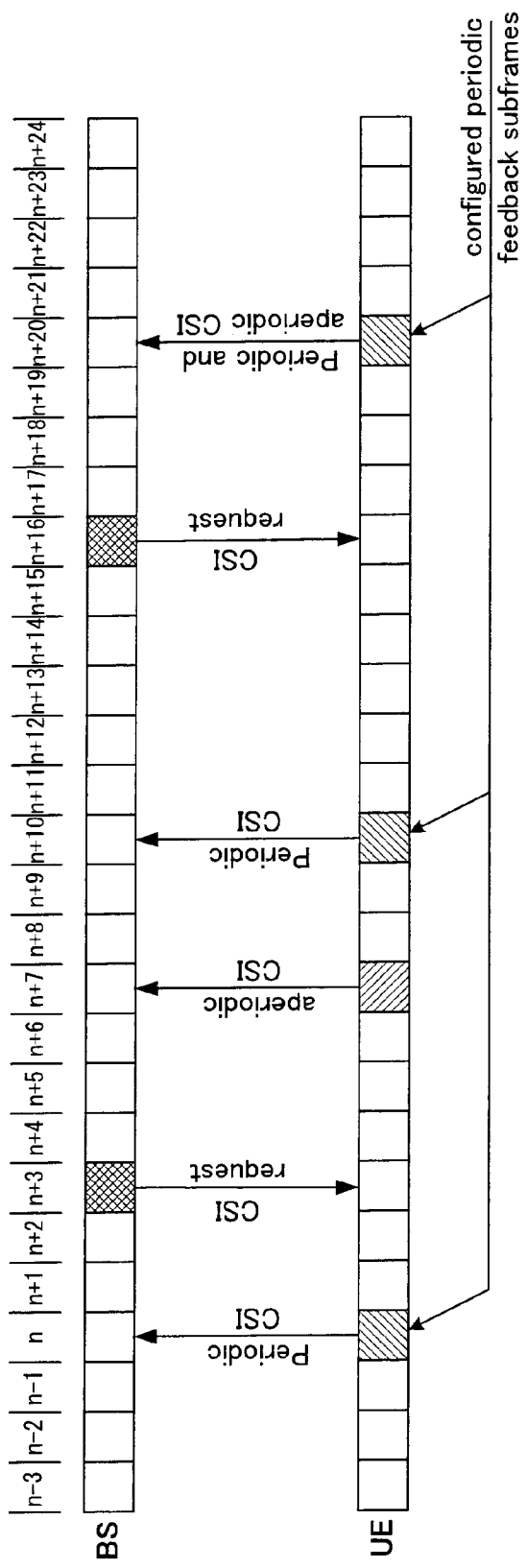
FIG. 6 is the third example of the trigger mechanism for CSI feedback on PUSCH.

FIG. 6 shows another example of the CSI transmission via PUSCH. In FIG. 6 periodic and aperiodic CSI transmission via PUSCH can be triggered on a single subframe. Here, the UE can be configured to transmit CSI via PUSCH periodically. Also, the UE can be configured to transmit CSI via PUCCH aperiodically. The base station schedules and configures, to the UE, the periodic feedback subframes (e.g., subframe n, subframe n+10, subframe n+20) via higher layer signaling (e.g., RRC signaling) semi-statically. For example, the base station can configure, to the UE, periodicity (interval) for the periodic CSI transmission. Also, for example, the base station can configure persistently, to the UE, resources of PUSCH and/or PUCCH for the periodic CSI transmission. The UE transmits, for example, the CSI of each component carrier with a cycle on these configured periodic feedback subframes.

Also the UE can be configured to transmit CSI via PUSCH aperiodically. The base station transmits, to the UE, the DCI formats including the CSI request via PDCCH on different component carriers. The CSI request in DCI format on one component carrier requests the UE to feedback the aperiodic CSI of this component carrier. Here, when the periodic CSI transmission via PUCCH and aperiodic CSI transmission via PUSCH collide, both of them are transmitted via PUSCH on single subframe. Namely, the UE transmits, to the base station, the periodic CSI and the aperiodic CSI via PUSCH in case that the periodic CSI transmission and the aperiodic CSI transmission would occur at the same subframes.

For example, in FIG. 6, the base station configures, to the UE, subframe n, subframe n+10, and subframe n+20 as the configured periodic feedback subframes. On subframe n and subframe n+10, the UE transmits, to the base station, the periodic CSI because no aperiodic CSI is triggered to be transmitted on these subframes concurrently. On subframe n+3, the base station transmits, to the UE, the CSI request to trigger the aperiodic CSI feedback. The UE transmits, to the base station, the aperiodic CSI alone as a response on the subframe n+7. Similarly, the base station transmits, to the UE, the CSI request to trigger the aperiodic CSI feedback on subframe n+16. The UE should transmit, to the base station, the aperiodic CSI as a response on the subframe n+20. However, subframe n+20 is the configured periodic feedback subframe. So, on subframe n+20, the periodic CSI and the aperiodic CSI are transmitted together to the base station concurrently.

Figure 7:
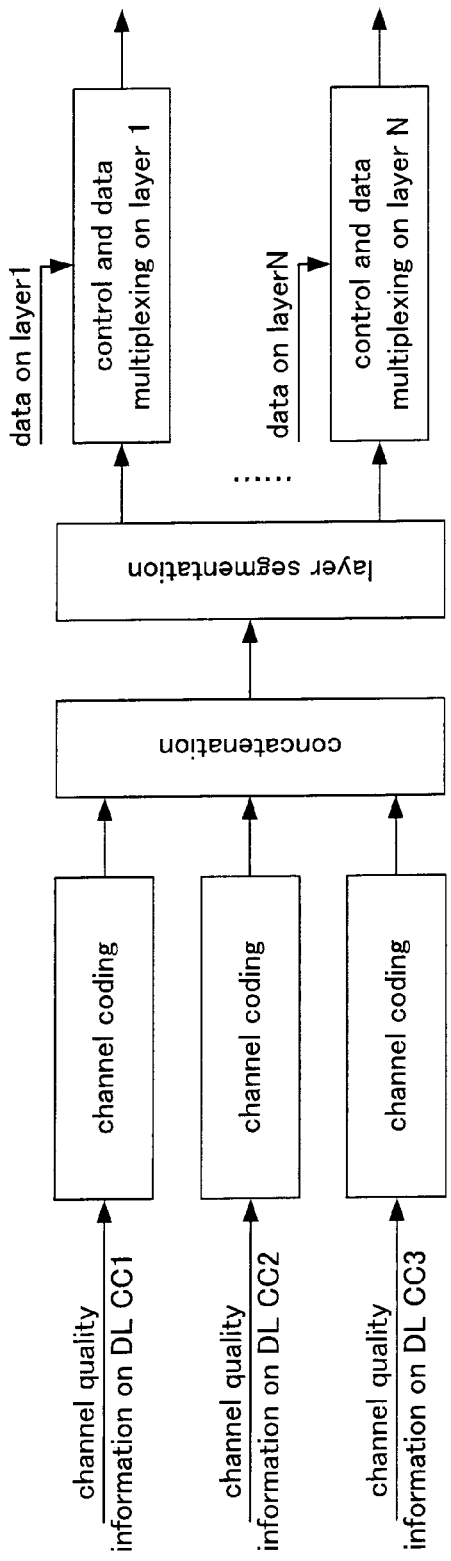
FIG. 7 is the first example of channel coding flowchart for CSI feedback on PUSCH.

FIG. 7 shows an example of the channel coding procedure of the channel quality information (CQI and/or PMI). Note that the following channel coding procedure will be applied to the above mentioned procedures of CSI transmission. As above mentioned, the UE can transmit, to the base station, multiple channel quality information for multiple DL CC(s). In FIG. 7, the channel quality information of multiple DL CC(s) can be channel coded separately and then segmented for mapping on multiple layers.

After the UE is triggered to transmit the channel quality information of multiple DL CC(s) simultaneously via one PUSCH, the channel coding and multiplexing procedure can be described as follows according to FIG. 7. For example, the UE is requested to transmit via one PUSCH the channel quality information of three component carriers (i.e., DL CC1, DL CC2, DL CC3) among its configured DL CC set simultaneously.

Firstly, the channel quality information of the three DL CCs is performed by channel coding separately. Here, for example, the channel quality information bits and format for each downlink component carrier could reuse that defined in LTE Rel-8. Also the same channel coding scheme as that defined in LTE Rel-8 could be reused. For example, if the payload size (k) of the channel quality information is less than or equal to 11 bits it is performed as (32, k) block coding without CRC attachment and rate matching. If the payload size of the channel quality information is greater than 11 bits, the tail biting convolutional coding is performed, the CRC attachment and rate matching is implemented accordingly.

And then, the UE determines the number of coded symbols for the channel quality information. For example, the UE determines the number of coded symbols for the channel quality information within each layer as in equation (1) if the channel quality information is only mapped on 1 codeword. Namely, the UE determines the number of coded symbols Q' separately channel coded channel quality information according to the equation (1).

$$Q' = \min\left(\left\lceil \frac{\sum_{c=0}^{C-1}(O_c + L_c) \cdot M_{sc}^{PUSCH-initial} \cdot N_{symb}^{PUSCH-initial} \cdot \beta_{offset}^{PUSCH}}{\sum_{r=0}^{R-1} K_r}\right\rceil, M_{sc}^{PUSCH} \cdot N_{symb}^{PUSCH} - Q'_{RI}\right) \quad (1)$$

where

The output of the function "min(A,B)" is the smaller one among A and B. For example, if A<B, min(A,B)=A.

$O_c$ is the number of channel quality information bits (including CQI bits and/or PMI bits) for DL CC number c, $L_c$ is the number of CRC bits given by $$L_c = \begin{cases} 0 & O_c \le 11 \\ 8 & \text{otherwise,} \end{cases}$$

C is the total number of DL CCs scheduled for the channel quality information feedback, $M_{SC}^{PUSCH-initial}$ is the initially scheduled bandwidth for the same transport block, which is obtained from the initial PDCCH, R is the number of code blocks for this transport block, $K_r$ is the number of bits for code block number r, $\beta_{offset}^{PUSCH}$ is the offset (e.g., MCS offset) configured by higher layer, $N_{symb}^{PUSCH-initial}$ is the number of SC-FDMA symbols per subframe (e.g., 12 SC-FDMA symbols) for initial PUSCH transmission for the same transport block, $M_{SC}^{PUSCH}$ is the scheduled bandwidth for current PUSCH in the unit of subcarrier, which is obtained from the current PDCCH, $N_{symb}^{PUSCH}$ is the number of SC-FDMA symbols (e.g., 12 SC-FDMA symbols) in current PUSCH transmission subframe, $Q'_{RI}$ is the number of coded symbols for RI.

From equation (1), the number of CRC bits is calculated for separate CCs. Here Lc is the number of CRC bits appended on the channel quality information bits of CCs.

Here, in case that PMI included in the channel quality information is indicated by the two constituent matrices (matrix indexes) the W_1 and the W_2, the number of PMI bits can be considered as the number of the W_1 only, or the W_2 only, or both the W_1 and the W_2.

Namely, the UE can transmit, to the base station, W_1 and/or W_2 via PUSCH for the determination of overall precoder by the base station. For example, the W_1 takes care of wideband and/or long-term channel properties (e.g., wideband PMI), and the W_2 tries to match the instantaneous properties of the effective channel (e.g., sub-band PMI or wideband PMI depending on CSI feedback mode). For example, the UE can transmit, to the base station, the W_1 via PUSCH with long-term interval when PUSCH is assigned by the base station. And, for example, the UE can transmit, to the base station, the W_2 via PUSCH with short-term interval when PUSCH is assigned by the base station. And, for example, the UE can transmit, to the base station, both of the W_1 and W_2 concurrently when PUSCH is assigned by the base station. The base station can determine the overall precoder by using the 2 kinds of matrices (matrix indexes) the W_1 and the W_2.

Namely, when the UE determines the number of coded symbols for the channel quality information, the number of the W_1 bits only can be included in the number of channel quality information bits. And when the UE determines the number of coded symbols for the channel quality information, the number of the W_2 bits only can be included in the number of channel quality information bits. And when the UE determines the number of coded symbols for the channel quality information, the number of both of the W_1 bits and W_2 bits can be included in the number of channel quality information bits.

Also, the number of DL CCs is considered as the number of DL CC configured by the base station. And, the number of DL CCs may be considered as the number of active DL CC among DL CC configured by the base station. The base station can activate, to the UE, DL CC among DL CC configured by the RRC signaling. For example, the base station can activate, to the UE, DL CC by using the MAC (Medium Access Control) signalling. Furthermore, the number of DL CCs may be considered as the maximum number of DL CC supported by the UE. The maximum number of DL CC is depends on the capability of the UE.

After the channel coding, the channel quality information of different DL CCs is concatenated serially. Then according to the real system, the concatenated channel quality information is segmented into several segmentations, each of which is mapped on one layer with the multiplexing of uplink transmit data. For example, it is defined that channel quality information is transmitted only on two layers of one codeword. Thus the concatenated channel quality information is divided into two parts. Each of them is mapped to each layer of the designated codeword.

Figure 8:
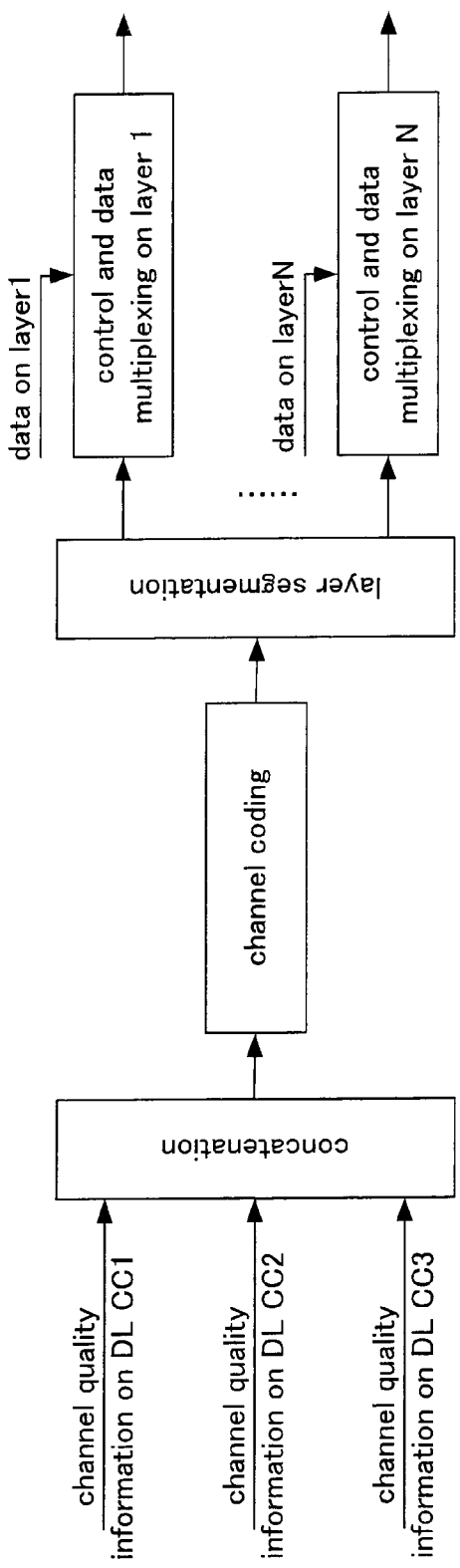
FIG. 8 is the second example of channel coding flowchart for CSI feedback on PUSCH.

FIG. 8 shows another example of the channel coding procedure of the channel quality information. Note that the following channel coding procedure will be applied to the above mentioned procedures of CSI transmission. As above mentioned, the UE can transmit, to the base station, multiple channel quality information for multiple DL CC(s). In FIG. 8, the channel quality information of multiple downlink component carriers can be channel coded jointly and then segmented for mapping on multiple layers.

After the UE is triggered to transmit the channel quality information of multiple DL CC(s) simultaneously via one PUSCH, the channel coding and multiplexing procedure can be described as follows according to FIG. 8. For example, the UE is requested to transmit via one PUSCH the channel quality information of three component carriers (i.e., DL CC1, DL CC2, DL CC3) among its configured DL CC set simultaneously.

Firstly, the channel quality information of the three DL CCs is concatenated together. Then the concatenated channel quality information is performed by channel coding jointly. Here, for example, channel coding scheme of LTE Rel-8 could be reused. If the payload size (k) of the channel quality information is less than or equal to 11 bits it is performed as (32,k) block coding without CRC attachment and rate matching. If the payload size of the channel quality information is greater than 11 bits, the tail biting convolutional coding is performed, the CRC attachment and rate matching is implemented accordingly.

And then, the UE determines the number of coded symbols for the channel quality information. For example, the UE determines the number of coded symbols for the channel quality information within each layer as the equation (2) if the channel quality information is only mapped on 1 codeword. Namely, the UE determines the number of coded symbols for jointly channel coded channel quality information according to the equation (2)

$$Q' = \min\left(\left\lceil\frac{\left[\left(\sum_{c=0}^{C-1} O_c + L\right) \cdot M_{sc}^{PUSCH\text{-}initial} \cdot N_{symb}^{PUSCH\text{-}initial} \cdot \beta_{offset}^{PUSCH}\right]}{\sum_{r=0}^{R-1} K_r}\right\rceil, M_{sc}^{PUSCH} \cdot N_{symb}^{PUSCH} - Q'_{RI}\right) \quad (2)$$

where

The output of the function "min(A,B)" is the smaller one among A and B. For example, if A<B, min(A,B)=A.

$O_c$ is the number of channel quality information bits (including CQI bits and/or PMI bits) for DL CC number c, L is the number of CRC bits given by $$L = \begin{cases} 0 & O_c \leq 11 \\ 8 & \text{otherwise,} \end{cases}$$

C is the total number of DL CCs scheduled for the channel quality information feedback, $M_{SC}^{PUSCH\text{-}initial}$ is the initially scheduled bandwidth for the same transport block, which is obtained from the initial PDCCH R is the number of code blocks for this transport block, $K_r$ is the number of bits for code block number r, $\beta_{offset}^{PUSCH}$ is the offset (e.g., MCS offset) configured by higher layer, $N_{symb}^{PUSCH\text{-}initial}$ is the number of SC-FDMA symbols per subframe (e.g., 12 SC-FDMA symbols) for initial PUSCH transmission for the same transport block, $M_{SC}^{PUSCH}$ is the scheduled bandwidth for current PUSCH in the unit of subcarrier, which is obtained from the current PDCCH $N_{symb}^{PUSCH}$ is the number of SC-FDMA symbols (e.g., 12 SC-FDMA symbols) in current PUSCH transmission subframe, $Q'_{RI}$ is the number of coded symbols for RI.

From equation (2), the number of CRC bits is calculated for concatenated channel quality information bits of multiple CCs. Here only one value L is obtained.

Similar to the equation (1), in case that PMI included in the channel quality information is indicated by the two constituent matrices (matrix indexes) the W_1 and the W_2, the number of PMI bits can be considered as the number of the W_1 only, or the W_2 only, or both of the W_1 and the W_2.

Namely, when the UE determines the number of coded symbols for the channel quality information, the number of the W_1 bits only can be included in the number of channel quality information bits. And when the UE determines the number of coded symbols for the channel quality information, the number of the W_2 bits only can be included in the number of channel quality information bits. And when the UE determines the number of coded symbols for the channel quality information, the number of both of the W_1 bits and W_2 bits can be included in the number of channel quality information bits.

In other words, as indicated in the above equation (1), (2), and below equation (3), the UE determines the number of coded symbol for the channel state information for multiple downlink component carriers, using the number of bits. Also, the number of coded symbol for the channel state information is obtained by concatenating channel state information bits for each downlink component carrier and attaching Cyclic Redundancy Check (CRC) bits to the concatenated channel state information bits for each downlink component carrier.

After channel coding, according to the real system, the coded channel quality information is segmented into several segmentations, each of which is mapped on one layer with the multiplexing of uplink transmit data. For example, it is defined that channel quality information is transmitted only on two layers of one codeword. Thus the concatenated channel quality information is divided into two parts. Each of them is mapped to each layer of the designated codeword.

Figure 9:
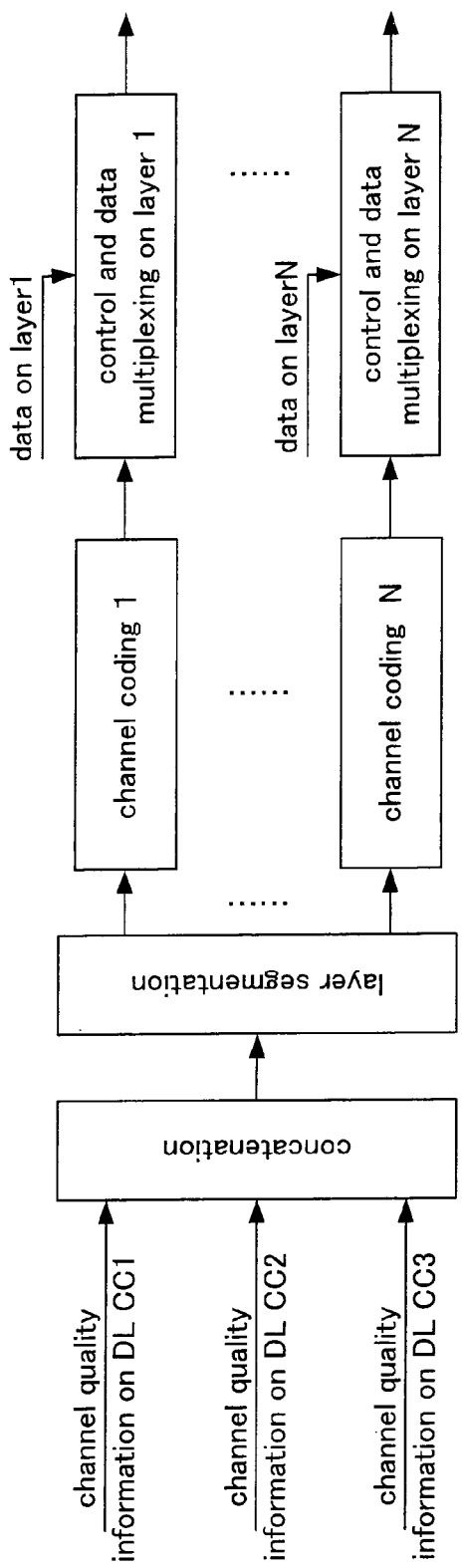
FIG. 9 is the third example of channel coding flowchart for CSI feedback on PUSCH.

FIG. 9 shows another example of the channel coding procedure of the channel quality information. As above mentioned, the UE can transmit, to the base station, multiple channel quality information for multiple DL CC(s). In FIG. 9, the channel quality information of multiple DL CC(s) can be segmented for mapping layers and channel coded layer-specifically.

After the UE is triggered to transmit the channel quality information of multiple DL CCs simultaneously via one PUSCH, the channel coding and multiplexing procedure can be described as follows according to FIG. 9. For example, the UE is requested to transmit via one PUSCH the channel quality information of three component carriers (i.e., DL CC1, DL CC2, DL CC3) among its configured DL CC set simultaneously.

Firstly, the channel quality information of the three DL CCs is concatenated together. According to the mapping layer number (the number of layers mapped by (current) transport block), the concatenated channel quality information is segmented into several segmentations. Note that the number of layers mapped by the transport block will be changed depending on the transmission modes, channel status, etc.

For example, it is defined that the channel quality information is transmitted only on two layers of one codeword. Thus the concatenated channel quality information is divided into two parts. Each of them is channel coded separately. Here, for example, the same channel coding scheme as that defined in LTE Rel-8 could be reused. If the payload size (k) of the channel quality information is less than or equal to 11 bits it is performed as (32, k) block coding without CRC attachment and rate matching. If the payload size of the channel quality information is greater than 11 bits, the tail biting convolutional coding is performed, the CRC attachment and rate matching is implemented accordingly.

Namely, the UE determines the number of coded symbols for the channel quality information. For example, the UE determines the number of coded symbols for the channel quality information within each layer as the equation (3) if the channel quality information is only mapped on 1 codeword. Namely, the UE determines the number of coded symbols for layer based channel coded channel quality information according to the equation (3)

$$Q' = \min\left(\left\lceil\frac{\left(\sum_{c=0}^{C-1} O_c + N \cdot L\right) \cdot M_{sc}^{PUSCH\text{-}initial} \cdot N_{symb}^{PUSCH\text{-}initial} \cdot \beta_{offset}^{PUSCH}}{\sum_{r=0}^{R-1} K_r}\right\rceil, M_{sc}^{PUSCH} \cdot N_{symb}^{PUSCH} - Q'_{RI}\right) \quad (3)$$

where

The output of the function "min(A,B)" is the smaller one among A and B. For example, if A<B, min(A,B)=A.

$O_c$ is the number of channel quality information bits (including CQI bits and/or PMI bits) for DL CC number c, L is the number of CRC bits given by $$L = \begin{cases} 0 & \sum_{c=0}^{C-1} O_c \leq 11N \\ 8 & \text{otherwise,} \end{cases}$$

N is the number of layers mapped by transport block,

C is the total number of DL CCs scheduled for the channel quality information feedback, $M_{SC}^{PUSCH\text{-}initial}$ is the initially scheduled bandwidth for the same transport block, which is obtained from the initial PDCCH R is the number of code blocks for this transport block, $K_r$ is the number of bits for code block number r, $\beta_{offset}^{PUSCH}$ is the offset (e.g., MCS offset) configured by higher layer, $N_{symb}^{PUSCH\text{-}initial}$ is the number of SC-FDMA symbols per subframe (e.g., 12 SC-FDMA symbols) for initial PUSCH transmission for the same transport block, $M_{SC}^{PUSCH}$ is the scheduled bandwidth for current PUSCH in the unit of subcarrier, which is obtained from the current PDCCH $N_{symb}^{PUSCH}$ is the number of SC-FDMA symbols (e.g., 12 SC-FDMA symbols) in current PUSCH transmission subframe, $Q'_{RI}$ is the number of coded symbols for RI.

From equation (3), the number of CRC bits is calculated according to the number of layers. Here N is the number layer and L is the number CRC bits appended on the channel quality information bits separated on each layer.

Similar to the equation (1) and (2), in case that PMI included in the channel quality information is indicated by the two constituent matrices (matrix indexes) the W__1 and the W__2, the number of PMI bits can be considered as the number of the W__1 only, or the W__2 only, or both of the W__1 and the W__2.

Namely, when the UE determines the number of coded symbols for the channel quality information, the number of the W__1 bits only can be included in the number of channel quality information bits. And when the UE determines the number of coded symbols for the channel quality information, the number of the W__2 bits only can be included in the number of channel quality information bits. And when the UE determines the number of coded symbols for the channel quality information, the number of both of the W__1 bits and W__2 bits can be included in the number of channel quality information bits.

According to the equation (3), the number of coded symbols for the channel quality information will be changed depending on the number of layers. The UE can determine the number of coded symbols for the channel quality information according to the number of layers.

After channel coding, each coded segment of the channel quality information is mapped on the relevant layer with the multiplexing of uplink transmit data.

Figure 10:
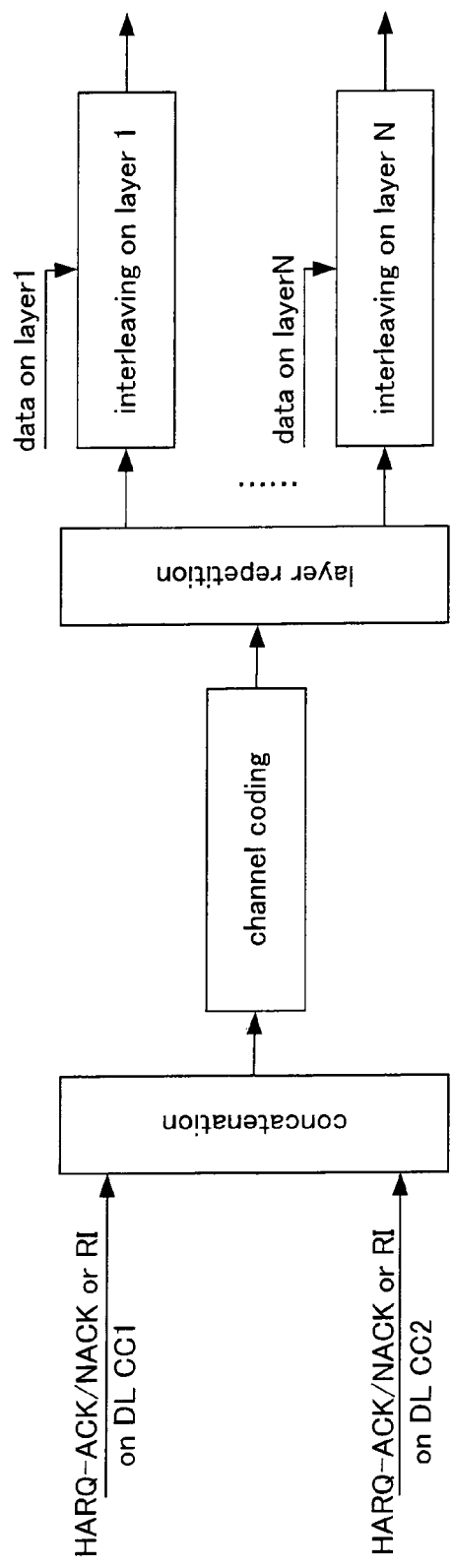
FIG. 10 is example of channel coding flowchart for HARQ-ACK/NACK and RI feedback on PUSCH.

FIG. 10 shows example of the channel coding procedure of HARQ-ACK/NACK and RI. The UE changes channel coding method of HARQ-ACK/NACK and RI for multiple DL CCs according to its real payload. If the UE is configured to transmit HARQ-ACK/NACK and/or RI for multiple DL CCs via one PUSCH, the channel coding and interleaving procedure can be described as follows according to FIG. 10.

Here, the UE can transmit, to the base station, (multiple) HARQ-ACK/NACK information of multiple transport blocks (i.e., multiple PDSCH) scheduled, in the same subframe, on multiple component carriers. For example, the UE transmits, to the base station, (two) HARQ-ACK/NACK information of two transport blocks (i.e., two PDSCH) scheduled, in the same subframe, on two component carriers. Namely, the UE can transmit, to the base station, (multiple) HARQ-ACK/NACK information of multiple transport blocks via PUSCH when the base station assign, to the UE, PUSCH.

Firstly, HARQ-ACK/NACK bits of transport blocks on two scheduled downlink component carriers in the same subframe are concatenated together. Then the concatenated HARQ-ACK/NACK bits perform channel coding. According to the capability of UEs and the scheduling of the base station, the number of HARQ-ACK/NACK bits varies from 1 to 10 bits. Here, assume maximum 5 component carriers aggregation and maximum 2 codewords per component carrier. For the channel coding, if the number of the concatenated HARQ-ACK/NACK bits is 1 or 2, encoding of 1-bit HARQ-ACK/NACK and 2-bit HARQ-ACK/NACK defined in LTE Rel-8 is reused; else new channel coding method is introduced for coding of 3-8 bits HARQ-ACK/NACK. For example, (20, k) block coding defined in LTE Rel-8 for channel coding for UCI channel quality information on PUCCH is introduced for coding of 3-8 bits HARQ-ACK/NACK. After channel coding, according to the real system, the coded HARQ-ACK/NACK information can be replicated (using layer repetition) and mapped on multiple layers with the interleaving of uplink data. For example, it is defined that HARQ-ACK/NACK is replicated on four layers of two codewords. Thus the coded HARQ-ACK/NACK bits are replicated four times. Each replication is mapped to each layer of two codewords. The mapping rule on each layer obeys that defined in LTE Rel-8 as shown in FIG. 2. It is noted that layer repetition only is used for HARQ-ACK/NACK and RI transmission.

In the channel coding procedure for ACK/NACK and RI the number of symbols also needs to de determined. In this case, the methods and equations used for ACK/NACK and RI is essentially the same as that defined in LTE Rel-8.0.

According to the present invention, the base station can perform flexible UCI multiplexing scheme on PUSCH in case of carrier aggregation. Therefore, it is possible for the base station to perform more efficient transmission control (scheduling) without causing additional complexity in the system.

(Mobile Communication System)

In the following descriptions, a mobile communication system according to the present invention will be described. The mobile communication system includes a base station and user equipment and the base station and user equipment may communicate with each other according to the method for UCI multiplexing on PUSCH in any above embodiment or its variation example.

Figure 11:
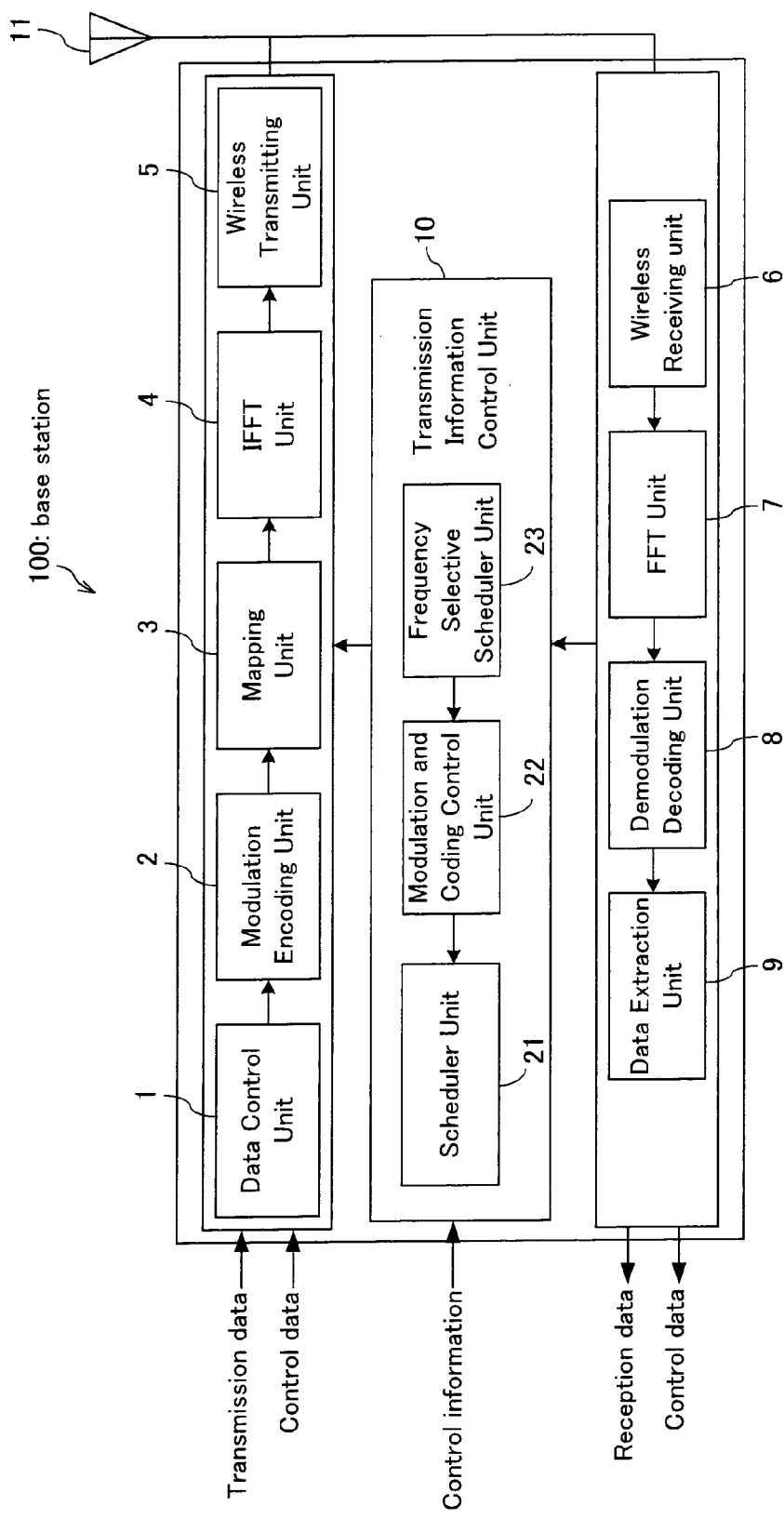
FIG. 11 is a functional block diagram showing a schematic configuration example of base station according to the present invention.

FIG. 11 is a functional block diagram showing a schematic configuration example of a base station according to the present invention.

As shown in FIG. 11, a base station 100 comprises a data control unit 1, a modulation encoding unit 2, a mapping unit 3, an inverse fast Fourier transform (IFFT) unit 4, a wireless transmitting unit 5, a wireless receiving unit 6, a fast Fourier transform (FFT) unit 7, a demodulation decoding unit 8, a data extraction unit 9, a transmission information control unit 10, and an antenna 11. The transmission information control unit 10 includes a scheduler unit 21, a modulation and coding control unit 22, and a frequency selective scheduler unit 23.

In the base station 100, transmission data and control data to be transmitted to user equipment is inputted to the data control unit 1, and the data is sequentially transmitted to the user equipment according to an instruction from the transmission information control unit 10. The modulation encoding unit 2 performs a modulation processing, or an error correction coding processing upon a signal outputted from the data control unit 1 based on a modulation scheme and a coding rate determined by the transmission information control unit 10 (modulation and coding control unit 22) and outputs the data to the mapping unit 3. The mapping unit 3 maps the data outputted from the modulation encoding unit 2 on each sub-carrier based on frequency selective scheduling information outputted from the transmission information control unit 10 (frequency selective scheduler unit 23) and outputs the data to the inverse fast Fourier transform unit 4.

The inverse fast Fourier transform unit 4 performs a processing of inverse fast Fourier transform upon the data outputted from the mapping unit 3, converts the data to a time-series base-band digital signal, and outputs the signal to the wireless transmitting unit 5. The wireless transmitting unit 5 performs digital/analog conversion of the output signal from the inverse fast Fourier transform unit 4, up-converts the signal to a frequency suitable for transmission, and then transmits the signal to each user equipment through the antenna 11.

The scheduler unit 21 schedules the downlink and the uplink based on control information, such as a resource region that each user equipment may use, an intermittent transmission reception cycle, a format of transmission data channel and a buffer status. The modulating and coding control unit 22 determines the modulation scheme and the coding rate to be applied to each data based on the channel quality information feedback on the physical uplink control channel from the user equipment. The frequency selective scheduler unit 23 executes a processing of frequency selective scheduling to be applied to each data based on the channel quality information feedback from the user equipment. The data extraction unit 9 separates demodulated and decoded data into reception data for user and control data, transfers the data to a superior processing unit, and outputs the data to the transmission information control unit 27.

As shown in FIG. 11, the various components of the base station may be coupled together or implemented as separate units.

Figure 12:
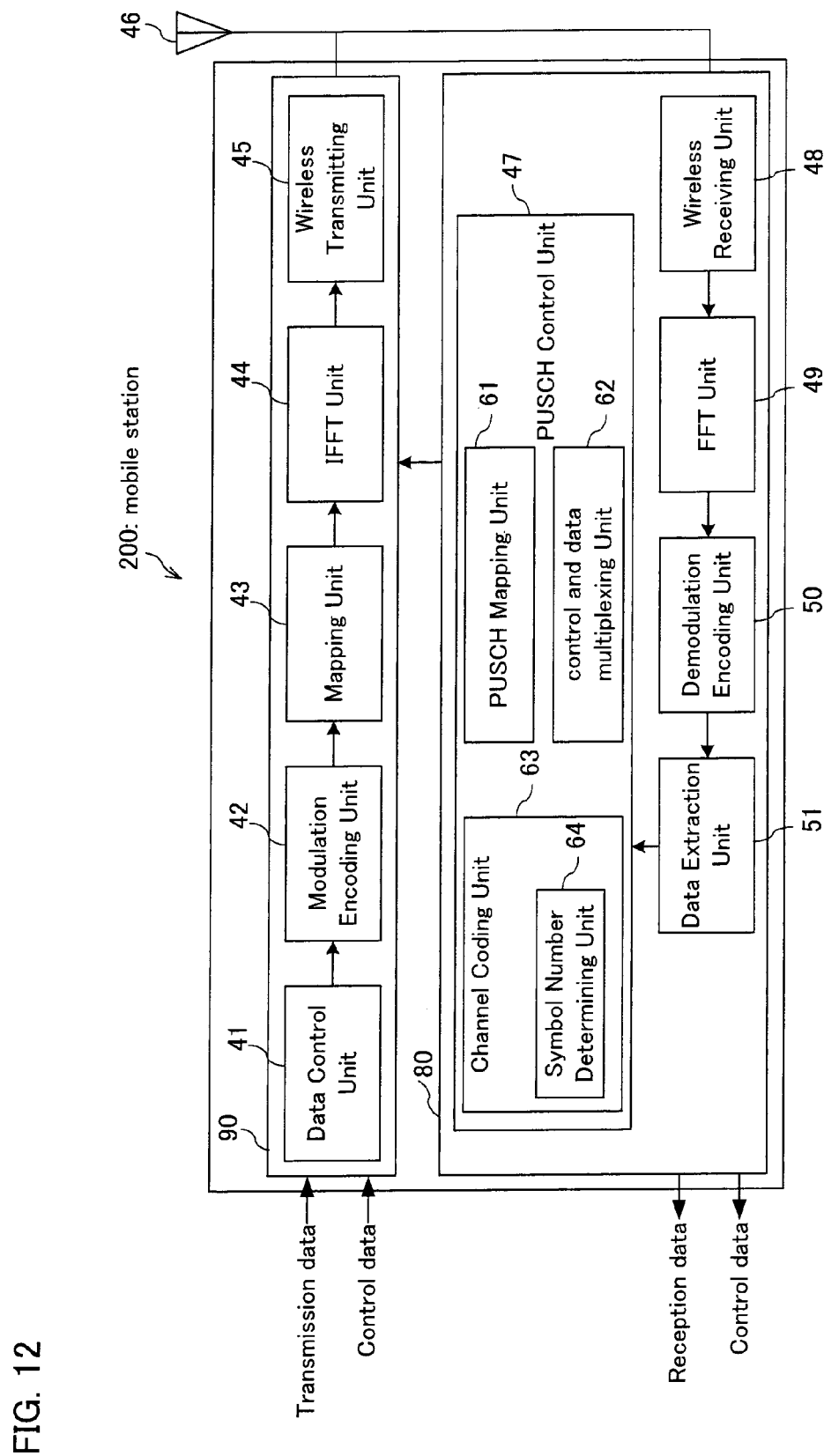
FIG. 12 is a functional block diagram showing a schematic configuration example of user equipment according to the present invention.

FIG. 12 is a functional block diagram showing a schematic configuration example of user equipment according to the present invention.

As shown in FIG. 12, a user equipment 200 comprises a data control unit 41, a modulation encoding unit 42, a mapping unit 43, an inverse fast Fourier transform (IFFT) unit 44, a wireless transmitting unit 45, an antenna 46, a PUSCH control unit 47, a wireless receiving unit 48, a fast Fourier transform (FFT) unit 49, a demodulation decoding unit 50 and a data extraction unit 51. The PUSCH control unit 47 comprises a control and data multiplexing unit 62, a PUSCH mapping unit 61 and a channel control unit 63.

The wireless receiving unit 48, the FFT unit 49, the demodulation decoding unit 50, the data extraction unit 51, and the PUSCH control unit 47 constitute a receiving unit 80 as a whole, and the data control unit 41, the modulation encoding unit 42, the mapping unit 43, the inverse fast Fourier transform (IFFT) unit 44, and the wireless transmitting unit 45 constitute a transmitting unit 90 as a whole.

In the user equipment 200 shown in FIG. 12, transmission data and control data to be transmitted to the base station 100 are inputted to the data control unit 41, and the data is sequentially transmitted to the base station 100. The modulation encoding unit 42 performs a modulation processing or an error correction coding processing upon a signal outputted from the data control unit 41 and outputs the data to the mapping unit 43. The mapping unit 43 maps the data outputted from the modulation encoding unit 42 on each sub-carrier and outputs the data to the inverse fast Fourier transform unit 44.

The inverse fast Fourier transform unit 44 performs a processing of inverse fast Fourier transform upon a symbol sequence outputted from the mapping unit 43, converts the symbol sequence to a time-series base-band digital signal, and outputs the signal to the wireless transmitting unit 45. The wireless transmitting unit 45 performs digital/analog conversion to the output signal from the inverse fast Fourier transform unit 44, up-converts the signal to a frequency suitable for transmission, and then transmits the signal to the base station 100 through the antenna 46.

The control and data multiplexing unit 62 multiplexes the uplink control information and transmit data into an interleaver. The PUSCH mapping unit 61 maps the multiplexed control and data information into multiple layers of multiple codewords.

The channel coding unit 63 includes a symbol number determining unit 64, which is the section used by the UE to determine the number of coded symbols for channel quality information. In particular, the symbol number determining unit 64 determines the number of coded symbols for the channel quality information according to equation (1), (2) and (3) disclosed above.

In another alternative example of the base station in FIG. 11 and the user equipment in FIG. 12, the device (BS or UE) may be implemented to include a processor and a memory.

The memory, which may include both read-only memory (ROM) and random access memory (RAM), provides instructions and data to the processor. A portion of the memory may also include non-volatile random access memory (NVRAM). The memory may include any electronic component capable of storing electronic information, and may be embodied as ROM, RAM, magnetic disk storage media, optical storage media, flash memory, on-board memory included with the processor, EPROM memory, EEPROM memory, registers, a hard disk, a removable disk, a CD-ROM, etc. The memory may store program instructions and other types of data. The program instructions may be executed by the processor to implement some or all of the methods disclosed herein so as to realize the PUCCH resource assignment.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the embodiments disclosed herein may be implemented or performed with a general purpose processor, a digital signal processor (DSP), an application specific integrated circuit (ASIC), a field programmable gate array signal (FPGA) or other programmable logic elements, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration. In an alternative embodiment, integrated circuits may be adopt to store programs which realizes the methods at the base station and/or the user equipment when being executed, and the integrated circuits may be mounted on the base station and the user equipment respectively.

The steps of a method or algorithm described in connection with the embodiments disclosed herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the embodiment that is being described, the order and/or use of specific steps and/or actions may be modified without departing from the scope of the claims.

The present invention can include a communication method for uplink control information transmission on physical uplink shared channel, the method comprising: a base station notifies, to a user equipment, the downlink control information including the trigger for uplink control information transmission via physical uplink shared channel, the user equipment determines the number of symbols for channel coded uplink control information, and transmits, to the base station the uplink control information with determined number of symbols via physical uplink shared channel.

The present invention can also include a communication method for uplink control information transmission on physical uplink shared channel, the method comprising: a base station notifies, to a user equipment, the downlink control information including the trigger for uplink control information transmission via physical uplink shared channel, the user equipment determines the number of symbols for separately channel coded uplink control information, and transmits, to the base station the uplink control information with determined number of symbols via physical uplink shared channel.

The present invention can also include a communication method for uplink control information transmission on physical uplink shared channel, the method comprising: a base station notifies, to a user equipment, the downlink control information including the trigger for uplink control information transmission via physical uplink shared channel, the user equipment determines the number of symbols for jointly channel coded uplink control information, and transmits, to the base station the uplink control information with determined number of symbols via physical uplink shared channel.

The present invention can also include a communication method for uplink control information transmission on physical uplink shared channel, the method comprising: a base station notifies, to a user equipment, the downlink control information including the trigger for uplink control information transmission via physical uplink shared channel, the user equipment determines the number of symbols for layer based channel coded uplink control information, and transmits, to the base station the uplink control information with determined number of symbols via physical uplink shared channel.

In the communication methods of the present invention the uplink control information includes channel quality indicator.

Also in the communication methods of the present invention the uplink control information includes precoding matrix index. In another embodiment, the precoding matrix index is indicated by two kinds of matrix.

The present invention can also include a communication method of a user equipment for uplink control information transmission on physical uplink shared channel, the method comprising: notifies, from a base station, the downlink control information including the trigger for uplink control information transmission via physical uplink shared channel, determines the number of symbols for channel coded uplink control information, and transmits, to the base station the uplink control information with determined number of symbols via physical uplink shared channel.

The present invention can also include a communication method of a user equipment for uplink control information transmission on physical uplink shared channel, the method comprising: notifies, from a base station, the downlink control information including the trigger for uplink control information transmission via physical uplink shared channel, determines the number of symbols for separately channel coded uplink control information, and transmits, to the base station the uplink control information with determined number of symbols via physical uplink shared channel.

The present invention can also include a communication method of a user equipment for uplink control information transmission on physical uplink shared channel, the method comprising: notifies, from a base station, the downlink control information including the trigger for uplink control information transmission via physical uplink shared channel, determines the number of symbols for jointly channel coded uplink control information, and transmits, to the base station the uplink control information with determined number of symbols via physical uplink shared channel.

The present invention can also include a communication method of a user equipment for uplink control information transmission on physical uplink shared channel, the method comprising: notifies, from a base station, the downlink control information including the trigger for uplink control information transmission via physical uplink shared channel, determines the number of symbols for layer based channel coded uplink control information, and transmits, to the base station the uplink control information with determined number of symbols via physical uplink shared channel.

In the communication methods of the present invention the uplink control information includes channel quality indicator.

Also in the communication methods of the present invention the uplink control information includes precoding matrix index. In another embodiment, the precoding matrix index is indicated by two kinds of matrix.

Some embodiments of the present invention disclose a user equipment, wherein the number of the Cyclic Redundancy Check (CRC) bits is determined using the number of bits obtained by concatenating the channel state information bits for each downlink component carrier.

Some embodiments of the present invention disclose a user equipment, wherein the channel state information includes channel quality indicator.

Some embodiments of the present invention disclose a user equipment, wherein the channel state information includes precoding matrix indicator.

Some embodiments of the present invention disclose a user equipment, wherein the channel state information includes wideband precoding matrix indicator.

Some embodiments of the present invention disclose a base station apparatus, wherein the number of the Cyclic Redundancy Check (CRC) bits is determined, by the user equipment, using the number of bits obtained by concatenating the channel state information bits for each downlink component carrier.

Some embodiments of the present invention disclose a base station apparatus, wherein the channel state information includes channel quality indicator.

Some embodiments of the present invention disclose a base station apparatus, wherein the channel state information includes precoding matrix indicator.

Some embodiments of the present invention disclose a base station apparatus, wherein the channel state information includes wideband precoding matrix indicator.

Furthermore, the present invention can be expressed as follows:

(1st invention) A user equipment apparatus for uplink control information transmission, comprising:

a receiving unit for receiving from a base station apparatus notification of downlink control information including a trigger for uplink control information transmission, a symbol number determining unit for determining a number of symbols for channel coded uplink control information; and a transmitting unit for transmitting to the base station apparatus the channel coded uplink control information with the determined number of symbols.

By determining the number of symbols for channel coded uplink control information even if multiple DL CCs are configured for data transmission, the present invention can transmit the increased UCI via PUSCH to the base station effectively. According to the scheduling, different numbers of symbols for channel coded UCI can be deduced easily. This leads to the advantageous effects of (1) the base station and user equipment being able to perform a flexible UCI multiplexing scheme on PUSCH, and (2) the base station and user equipment being able to achieve an effective channel coding performance.

(2nd invention) A user equipment apparatus according to the 1st invention, wherein the symbol number determining unit may determine the number of symbols separately for each of multiple downlink component carriers transmitted from the base station to the user equipment apparatus.

The effect of determining the number of symbols separately is that a reception error occurring on the UCI of one CC will not influence the UCI reception of the other CCs. Also, separate channel coding is totally compatible with that defined in LTE Rel-8.0.

(3rd invention) A user equipment apparatus according to the 1st invention, wherein the symbol number determining unit may determine the number of symbols jointly for multiple downlink component carriers transmitted from the base station to the user equipment apparatus.

The effect of determining the number of symbols jointly is that redundant bits can be saved (ie. some resource elements can be saved for data transmission). It also allows new robust channel coding schemes to be introduced at the same cost of resource elements.

(4th invention) A user equipment apparatus according to the 1st invention, wherein the symbol number determining unit may determine the number of symbols according to the number of layers mapped by a downlink transport block from the base station to the user equipment apparatus.

The effect of determining the number of symbols according to the number of layers mapped is a compromise between the effects from separate and joint determining of the symbols. In other words, the effect is a combination of reducing the influence of reception error on multiple CCs and ensuring that redundant bits can be saved.

(5th invention) A user equipment apparatus according to the 1st invention, wherein the uplink control information may include a channel quality indicator.

The effect of this is to create a more efficient transmission control (scheduling) between the base station and the user equipment.

(6th invention) A user equipment apparatus according to the 1st invention, wherein the uplink control information may include a precoding matrix index.

The effect of this is to create a more efficient transmission control (scheduling) between the base station and the user equipment.

(7th invention) A user equipment apparatus according to the 6th invention, wherein the precoding matrix may be indicated by one kind of matrix; wherein the one kind of matrix deals with either (i) wide and and/or long-term channel properties, or (ii) instantaneous properties of an effective channel.

The effect of this is to create a more efficient transmission control (scheduling) between the base station and the user equipment.

(8th invention) A user equipment apparatus according to the 6th invention, wherein the precoding matrix may be indicated by two kinds of matrix; wherein one matrix of the two kinds of matrix deals with wideband and/or long-term channel properties; and the other matrix of the two kinds of matrix deals with instantaneous properties of an effective channel.

The effect of this is to create a more efficient transmission control (scheduling) between the base station and the user equipment.

(9th invention) A user equipment apparatus according to the 1st invention, wherein the uplink control information transmission may be on a physical uplink shared channel.

The effect of this is to ensure a more efficient transmission control (scheduling) between the base station and the user equipment.

(10th invention) A base station apparatus for uplink control information transmission, comprising:

a transmitting unit for transmitting to a user equipment apparatus notification of downlink control information including a trigger for uplink control information transmission;

a receiving unit for receiving from the user equipment apparatus a channel coded uplink control information with a number of symbols determined by the user equipment apparatus.

The effect of this is that the base station and user equipment can perform flexible UCI multiplexing scheme on PUSCH and the base station and user equipment can perform effective channel coding performance.

(11th invention) A communication system including a user equipment apparatus and a base station apparatus for uplink control information transmission, comprising:

a transmitting unit in the base station apparatus for transmitting notification of downlink control information including a trigger for uplink information transmission; a receiving unit in the user equipment apparatus for receiving the notification of downlink control information including the trigger for uplink information transmission;

a symbol number determining unit in the user equipment apparatus for determining a number of symbols for channel coded uplink control information;

a transmitting unit in the user equipment apparatus for transmitting the channel coded uplink control information with the determined number of symbols; and a receiving unit in the base station apparatus for receiving the channel coded uplink control information with the determined number of symbols.

The effect of this is that the base station and user equipment can perform flexible UCI multiplexing scheme on PUSCH and the base station and user equipment can perform effective channel coding performance.

(12th invention) A communication method of a user equipment apparatus for uplink control information transmission, the method comprising:

receiving step for receiving from a base station apparatus notification of downlink control information including a trigger for uplink control information transmission;

symbol number determining step for determining a number of symbols for channel coded uplink control information; and transmitting step for transmitting to the base station apparatus the channel coded uplink control information with the determined number of symbols.

The effect of this is that the base station and user equipment can perform flexible UCI multiplexing scheme on PUSCH and the base station and user equipment can perform effective channel coding performance.

(13th invention) A communication method of a base station apparatus for uplink control information transmission, the method comprising:

transmitting step for transmitting to a user equipment apparatus notification of downlink control information including a trigger for uplink control information transmission;

receiving step for receiving from the user equipment apparatus a channel coded uplink control information with a number of symbols determined by the user equipment.

The effect of this is that the base station and user equipment can perform flexible UCI multiplexing scheme on PUSCH and the base station and user equipment can perform effective channel coding performance.

(14th invention) A communication method of a communication system including a user equipment apparatus and a base station apparatus for uplink control information transmission, the method comprising:

transmitting step for transmitting from the base station apparatus notification of downlink information including a trigger for uplink control information transmission;

receiving step for receiving at the user equipment apparatus the notification of downlink control information including the trigger for uplink information transmission;

symbol number determining step for determining in the user equipment apparatus a number of symbols for channel coded uplink control information;

transmitting step for transmitting from the user equipment apparatus the channel coded uplink control information with the determined number of symbols; and receiving step for receiving at the base station apparatus the channel coded uplink control information with the determined number of symbols.

The effect of this is that the base station and user equipment can perform flexible UCI multiplexing scheme on PUSCH and the base station and user equipment can perform effective channel coding performance.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

INDUSTRIAL APPLICABILITY

The present invention is applicable to any systems such as Third Generation (3G), Super Third Generation (S3G), Fourth Generation (4G) cellular mobile communication and digital televisions, wireless local area network (WLAN), self-organized network (Mesh, Ad Hoc, Censor Network), electronic home (e-Home) network, wireless wide area network (WWAN), and etc.

The invention claimed is:

1. A user equipment configured to communicate with a base station apparatus using a plurality of downlink component carriers, the user equipment comprising:

a receiving unit configured to receive on a physical downlink control channel, from a base station apparatus, downlink control information including information requesting to transmit channel state information; and a transmitting unit configured to transmit on a physical uplink shared channel, to the base station apparatus, the channel state information in a case that the downlink control information is received, wherein in a case of the transmission of the channel state information for more than one downlink component carrier, the number of coded symbols for the channel state information is determined based on the number of bits given by attaching Cyclic Redundancy Check (CRC) bits to a result of concatenating the channel state information for each downlink component carrier.

2. The user equipment according to claim 1, the number of the Cyclic Redundancy Check (CRC) bits is given by the number of bits of the result of concatenating the channel state information for each downlink component carrier.

3. The user equipment according to claim 1, the channel state information is a channel quality indicator.

4. The user equipment according to the claim 1, the channel state information is a precoding matrix indicator.

5. The user equipment according to the claim 1, the channel state information is a channel quality indicator and a pr-coding matrix indicator.

6. A base station apparatus configured to communicate with a user equipment using a plurality of downlink component carriers, the base station apparatus comprising:
   a transmitting unit configured to transmit on a physical downlink control channel, to a user equipment, downlink control information including information requesting to transmit channel state information; and
   a receiving unit configured to receive on a physical uplink shared channel, from the user equipment, the channel state information in a case that the downlink control information is transmitted, wherein
   for the channel state information for more than one downlink component carrier, the number of coded symbols for the channel state information is determined based on the number of bits given by attaching Cyclic Redundancy Check (CRC) bits to a result of concatenating the channel state information for each downlink component carrier.

7. The base station apparatus according to the claim 6, the number of the Cyclic Redundancy Check (CRC) bits is given by the number of bits of the result of concatenating the channel state information for each downlink component carrier.

8. The base station apparatus according to the claim 6, the channel state information is a channel quality indicator.

9. The base station apparatus according to the claim 6, the channel state information is a precoding matrix indicator.

10. The base station apparatus according to the claim 6, the channel state information is a channel quality indicator and a precoding matrix indicator.

11. A method of a user equipment configured to communicate with a base station apparatus using a plurality of downlink component carriers, the method comprising:
    receiving on a physical downlink control channel, from a base station apparatus, downlink control information including information requesting to transmit channel state information; and
    transmitting on a physical uplink shared channel, to the base station apparatus, the channel state information in a case that the downlink control information is received, wherein
    in a case of the transmission of the channel state information for more than one downlink component carrier, the number of coded symbols for the channel state information is determined based on the number of bits given by attaching Cyclic Redundancy Check (CRC) bits to a result of concatenating the channel state information for each downlink component carrier.

12. A method of a base station apparatus configured to communicate with a user equipment using a plurality of downlink component carriers, the method comprising:
    transmitting on a physical do link control channel, to a user equipment, downlink control information including information requesting to transmit channel state information; and
    receiving on a physical uplink shared channel, from the user equipment, the channel state information in a case that the downlink control information is transmitted, wherein
    for the channel state information for more than one downlink component carrier, the number of coded symbols for the channel state information is determined based on the number of bits given by attaching Cyclic Redundancy Check (CRC) bits to a result of concatenating the channel state information for each downlink component carrier.

13. The user equipment according to claim 1, wherein the channel state information is transmitted on the physical uplink shared channel together with uplink shared channel (UL-SCH) data.

14. The base station apparatus according to claim 6, wherein the channel state information is transmitted on the physical uplink shared channel together with uplink shared channel (UL-SCH) data.

15. The communication method according to claim 11, wherein the channel state information is transmitted on the physical uplink shared channel together with uplink shared channel (UL-SCH) data.

16. The communication method according to claim 12, wherein the channel state information is transmitted on the physical uplink shared channel together with uplink shared channel (UL-SCH) data.

* * * * *